US008977062B2

(12) United States Patent
Gonzalez et al.

(10) Patent No.: US 8,977,062 B2
(45) Date of Patent: Mar. 10, 2015

(54) REDUCTION OF CFAR FALSE ALARMS VIA CLASSIFICATION AND SEGMENTATION OF SAR IMAGE CLUTTER

(71) Applicant: Raytheon Company, Waltham, MA (US)

(72) Inventors: Johan Enmanuel Gonzalez, El Segundo, CA (US); Albert Ezekiel, Los Angeles, CA (US)

(73) Assignee: Raytheon Company, Waltham, MA (US)

(*) Notice: Subject to any disclaimer, the term of this patent is extended or adjusted under 35 U.S.C. 154(b) by 131 days.

(21) Appl. No.: 13/776,586

(22) Filed: Feb. 25, 2013

(65) Prior Publication Data

US 2014/0241639 A1     Aug. 28, 2014

(51) Int. Cl.
| | |
|---|---|
| *G06K 9/62* | (2006.01) |
| *G01S 7/292* | (2006.01) |
| *G01S 13/90* | (2006.01) |
| *G06K 9/00* | (2006.01) |

(52) U.S. Cl.
CPC .............. *G06K 9/6267* (2013.01); *G01S 7/2927* (2013.01); *G01S 13/90* (2013.01); *G06K 9/0063* (2013.01)
USPC ........................................................ 382/225

(58) Field of Classification Search
USPC ........................................................ 382/225
See application file for complete search history.

(56) References Cited

U.S. PATENT DOCUMENTS

| | | | |
|---|---|---|---|
| 5,430,445 | A | 7/1995 | Peregrim et al. |
| 7,787,657 | B2 | 8/2010 | Khatib et al. |

(Continued)

FOREIGN PATENT DOCUMENTS

EP     2 500 864 A1     9/2012

OTHER PUBLICATIONS (Tristrom Cooke, "Detection and Classification of Objects in Synthetic Aperture Radar Imagery", Feb. 2006, Defense Science and Technology Organisation, Australia).*

(Continued)

*Primary Examiner* — Shefali Goradia
*Assistant Examiner* — Totam Le
(74) *Attorney, Agent, or Firm* — Christie, Parker & Hale, LLP (57) ABSTRACT

The classification and segmentation system of the current invention makes use of information from pixels of an image, namely the magnitude of the pixels, to run specific analytics to classify and segment the image pixels into different groups. This invention includes a system for processing an image, the system including an input device, a processor, a memory and a monitor. The input device is configured to receive image data, where the image data includes pixels and each pixel has a magnitude. The memory has instructions stored in it that, when executed by the processor, cause the processor to run calculations. The calculations include: calculating the log-magnitudes from the magnitudes of at least a plurality of the pixels, calculating standard deviations of the log-magnitudes for subsets of the plurality of pixels and compute an integral of the standard deviations over a desired range. The pixels are classified into different groups based on a value of the integral relative to one or more integral values. In one embodiment, a monitor is configured to display a threshold image, wherein the threshold image includes the different groups of pixels.

16 Claims, 8 Drawing Sheets

(56) References Cited

U.S. PATENT DOCUMENTS 7,961,975 B2 6/2011 Lankoande et al.
2010/0052977 A1 3/2010 Sathyendra

OTHER PUBLICATIONS (Shuang Wang, "Segmentation Methods for Synthetic Aperture Radar", Apr. 2011, http://intechopen.com).*
Kreithen, Discrimination Targets from Clutter, The Lincoln Laboratory Journal, 1993, pp. 25-52, vol. 6, No. 1.
Novak, Performance of a High-Resolution Polarimetric SAR Automatic Target Recognition System, The Lincoln Laboratory Journal, 1993, pp. 11-24, vol. 6, No. 1.
Fosgate, Charles et al., Multiscale Segmentation and Anomaly Enhancement of SAR Imagery, Jan. 1997, pp. 7-20, vol. 6, No. 1, IEEE Transactions on Image Processing.
Lee, "Refined Filtering of Image Noise Using Local Statistics", Computer Graphics and Image Processing, Academic Press, New York, US, vol. 15, No. 4, Apr. 1, 1981 (pp. 380-389).
Lee, et al., "Segmentation of SAR Images", vol. 3, Sep. 12, 1988 (pp. 1503-1506).
Wei, et al., "A New Method of SAR Image Target Recognition based on AdaBoost Algorithm", Geoscience and Remote Sensing Symposium, 2008, Igarss 2008, IEEE International, IEEE, Piscataway, NJ, USA, Jul. 7, 2008 (pp. III-1194-III-1197).
Written Opinion of the International Searching Authority for International Application No. PCT/US2013/077697 filed Dec. 24, 2013, Written Opinion of the International Searching Authority mailed Sep. 22, 2014 (7 pgs.).
International Search Report for international Application No. PCT/US2013/077697 filed Dec. 24, 2013, International Search Report dated Sep. 15, 2014 and mailed Sep. 22, 2014 (4 pgs.).

* cited by examiner

REDUCTION OF CFAR FALSE ALARMS VIA CLASSIFICATION AND SEGMENTATION OF SAR IMAGE CLUTTER

BACKGROUND

Figure 1:
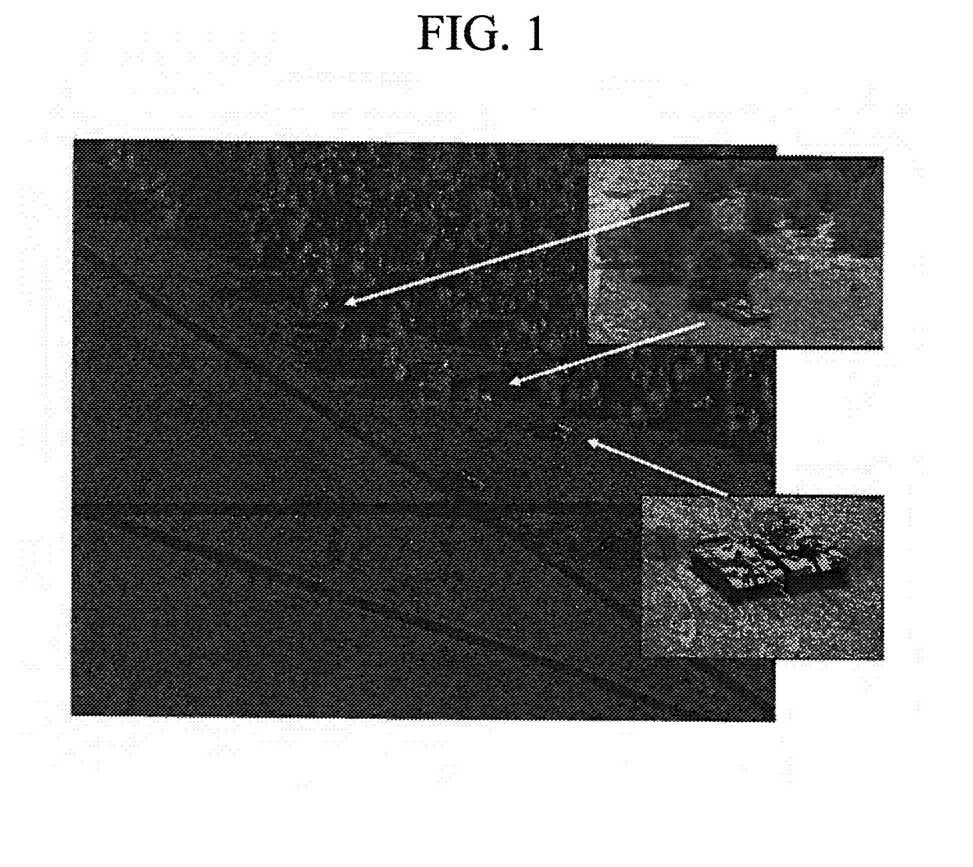
FIG. 1 shows an exemplary SAR image of targets along a tree line on which the method of the present invention can be operated.

An important function of a radar system, whether a Real Beam type, Synthetic Aperture (SAR) or Interferometric SAR is to detect a target as well as identify it. An example of a SAR image is shown in FIG. 1. Radar target detection and identification have been proven necessary in military surveillance, reconnaissance, and combat missions. The detection and identification of targets provide real-time assessment of the number and the locations of targets of interest.

One exemplary method of target detection and identification is to process the image acquired by the radar using Synthetic Aperture Radar (SAR) technology. By processing a SAR generated image, targets can be identified and the features of a target can be extracted and matched to a database for identification.

The general principle behind SAR is to obtain high-resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

Attempts have been made toward target identification extracted from SAR radar images. A commonly used technique to find man-made objects/targets in a SAR image is constant false alarm rate (CFAR), which is described in D. E. Kreithen, S. D. Halverson and G. J. Owirka's "Discriminating Targets from Clutter," Lincoln Lab, vol. 6, no. 1, 1993; and L. M. Novak, G. J. Owirka and C. M. Netishen's "Performance of a High-Resolution Polarimetric SAR Automatic Target Recognition System," Lincoln Lab, vol. 6, no. 1, 1993. However tactical targets can be found operating in many different terrains, namely areas with substantial tree forest coverage, making target identification using only CFAR difficult. Further, targets can also use the tree line to avoid detection from radar, such as shown in FIG. 1. The presence of the tree line adds clutter to the SAR image, changing the contour, obfuscating the rendition of a target in the SAR image and thereby significantly reducing the ability of automated processing techniques to detect and identify targets. When the existing CFAR is used in these situations, it can confuse trees for targets, causing false alarms and often overwhelming downstream targets.

Some attempts have been made to address these issues, reduce false alarms and improve target identification. For example, Charles H. Fosgate, and Hamid Krim in Multiscale Segmentation and Anomaly Enhancement of SAR Imagery, IEEE Transactions on Image Processing, Vol. 6, No. 1, January 1997, use complex algorithms associated with multiscale stochastic models to segment distinct cluster types, such as forest and grass, in order to facilitate target identification. The Coherent Multi-Scale (CMS) algorithm used in this article requires the phase information of the SAR image analyzed.

In another example, N. Khatib and A. Ezekiel in "SAR ATR Treeline Extended Operating Condition". U.S. Pat. No. 7,787,657, filed Mar. 9, 2009, attempt to mitigate natural clutter by comparing one or more historically known target characteristics and one or more measured characteristics to obtain an output, identifying boundaries for one or more objects within the output and suppressing clutter pixels that are identified external the one or more objects.

In another example, T. J. Peregrim, F. A. Okurowski and A. H. Long in "Synthetic aperture radar guidance system and method of operating same". U.S. Pat. No. 5,430,445, filed Dec. 31, 1992, compares each pixel of a SAR image with a target template until a match is provided.

Despite these attempts, high false alarm rates and clutter in the SAR image continue to cause problems in target identification.

SUMMARY

The classification and segmentation system of the current invention makes use of information from pixels of an image, namely the magnitude of the pixels, to run specific analytics to classify and segment the image pixels into different groups. For example, the classification and segmentation system can classify and segment the natural clutter of a SAR image into different terrain domains, such as forest, grass and desert. Then, as a further example, the method can be employed to identify grass clutter and suppress forest clutter, so that the downstream algorithms such as CFAR can be operated only on grass pixels, which substantially lowers the number of false alarms reported to downstream algorithms.

This invention includes a system for processing an image, the system including an input device, a processor and a memory. The input device is configured to receive image data, where the image data includes pixels and each pixel has a magnitude. The memory has instructions stored in it that, when executed by the processor, cause the processor to run calculations. The calculations include: calculating the log-magnitudes from the magnitudes of at least a plurality of the pixels, calculating standard deviations of the log-magnitudes for subsets of the plurality of pixels and compute an integral of the standard deviations over a desired range. The pixels are classified into groups based on a value of the integral relative to one or more integral values.

The invention also includes a method of processing an image having pixels, where each pixel has a magnitude. This method includes the steps of calculating the log-magnitudes from the magnitudes of at least a plurality of the pixels, calculating standard deviations of the log-magnitudes for subsets of the plurality of pixels, computing an integral of the standard deviations over a desired range and classifying the pixels into different groups based on a value of the integral relative to one or more integral values.

BRIEF DESCRIPTION OF THE DRAWINGS

Further features and advantages will become apparent from the description of the embodiments supported by the accompanying drawings. In the drawings:

FIG. 6a shows the threshold image including clusters of grass only and forest formed by applying a standard deviation threshold according to an embodiment of the invention.

FIG. 6b shows the threshold image with only the grass supercluster of FIG. 6a.

FIG. 6c shows the boundary of the grass supercluster during a boundary finding routine of FIG. 6b.

FIG. 6d shows the final binary image of an embodiment with a grown grass supercluster of FIGS. 6a-6c.

DETAILED DESCRIPTION

The classification and segmentation system of the invention makes use of information from pixels of an image, namely the magnitude of the pixels, to run specific analytics to classify and segment the image pixels into different groups to facilitate later identification of targets. The clutter classification and segmentation system and method of this invention differentiates between different types of clutter (e.g. forest, grass and desert) in a SAR image using the magnitude of the image's pixels. More specifically, the magnitudes of the pixels are used to calculate the log-magnitudes of the pixels, the log-magnitudes are used for calculating standard deviations of the log-magnitudes for contiguous subsets of the pixels, and the integral of the standard deviations is then calculated for a specific range. The pixels can be classified into different groups based on a value of the integral and all or some of the different groups can then be displayed on a threshold image, as exemplified in FIG. 6a. From the threshold image, one can see that contiguous pixels of natural clutter exhibit different levels of standard deviation values. For instance, grass pixels will exhibit a lower standard deviation in SAR image amplitudes, whereas forest pixels will have higher deviation.

Because one may not necessarily have a priori knowledge of the clutter conditions in the SAR images, this method provides an automatic means of classifying vegetation clutter. The statistics of the standard deviation and its integral, as embodied in this invention, can be exploited to identify the types of natural clutter present in the image. As an example, in areas with both grass and forested areas, the method can be employed for identifying grass clutter and identifying and suppressing forest clutter. The CFAR algorithm can then, for example, be operated only on grass pixels, which substantially lowers the number of false alarms reported to downstream algorithms.

Figure 2:
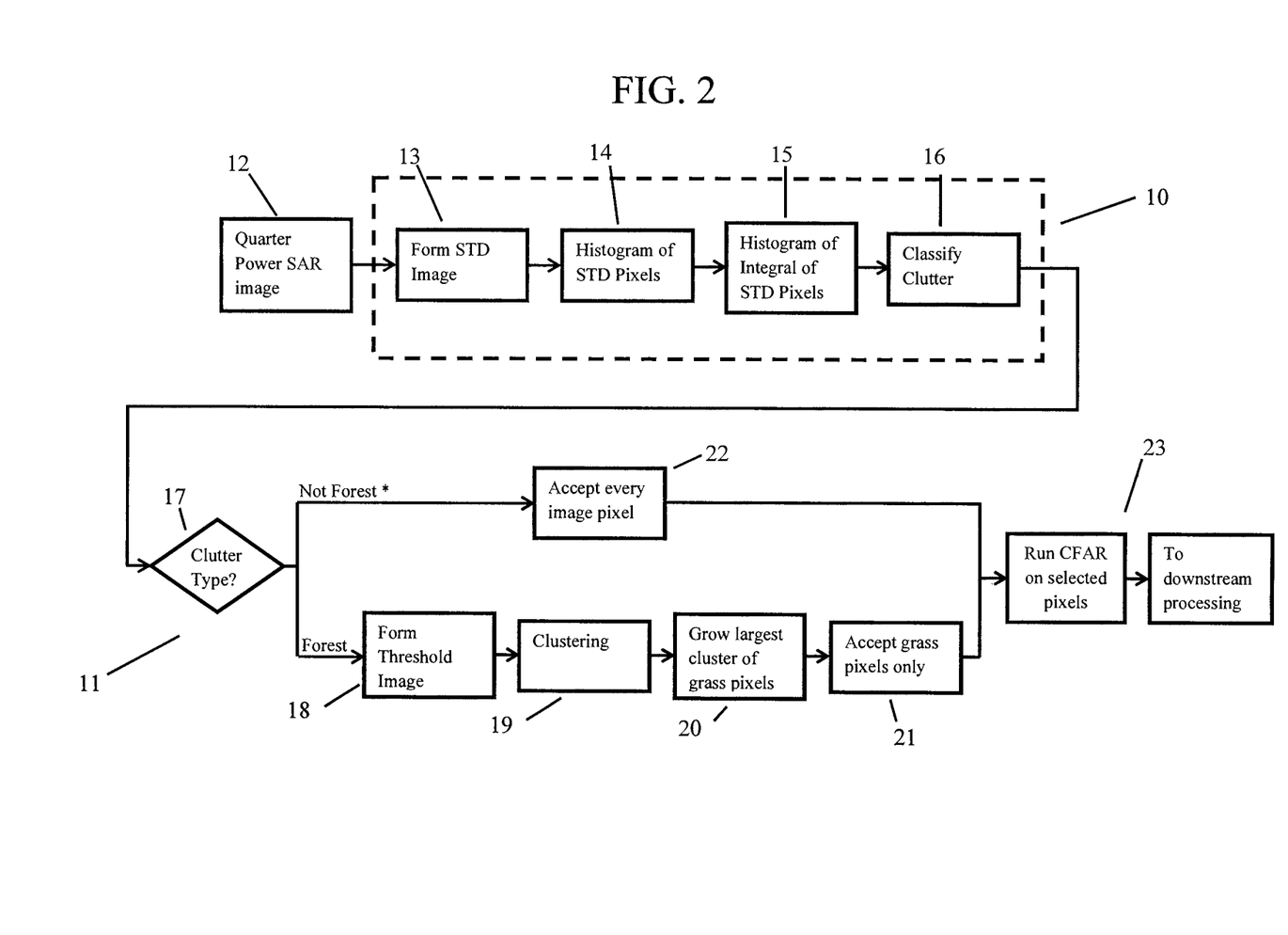
FIG. 2 shows a flowchart of an embodiment of the classification and segmentation system of the invention.

In FIG. 2, the invention is depicted as two stages, where the top level of the flow chart is first stage 10 and the bottom level includes the second stage 11. In the first stage 10, the general type or types of clutter present in the image are classified. In the second stage, the SAR image is segmented into different clutter or vegetation groups. This segmentation can be visualized by creating a threshold image on a display to view the different groups. Knowing the different groups, the unwanted vegetation clutter (such as, for example, forested areas) can then be screened out so that downstream algorithms can focus on finding man-made objects.

Classification of Clutter

Figure 3:
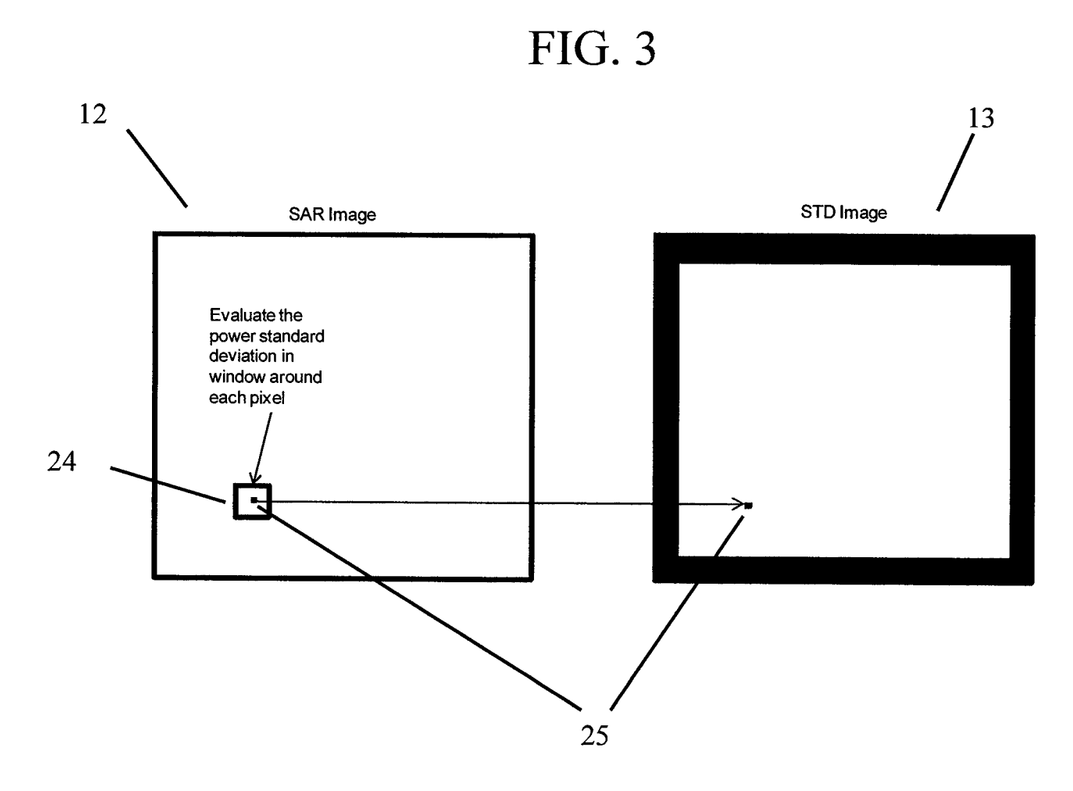
FIG. 3 shows a pictorial representation of the step of forming the standard deviation image from the SAR image according to an embodiment of the invention.

The first stage 10, as illustrated in FIG. 2, consists of SAR image clutter classification. The input SAR image 12 can be a quarter power SAR image, where quarter power is determined by calculating the square root of the quadrature sum of the "in-phase" and "quadrature" components of the complex signal. As exemplified in FIG. 2, a standard deviation (STD) image 13 can be formed from the input SAR image 12 by evaluating the standard deviation of the pixel powers/amplitudes in a window 24 around each pixel 25, as illustrated in FIG. 3. The size of the window 24 around each pixel 15 is selected so that the fluctuations in the measurement of the standard deviation are minimized while maximizing the accuracy between terrain boundaries. In this embodiment, the window size used to generate the image was 90×90 pixels. Other window sizes may be used based on the knowledge of one of ordinary skill in the art. The formation of the STD image 13 is followed by compiling a histogram 14 of standard deviation values of all the pixels 25 in the STD image 13, as exemplified in FIG. 4.

Figure 4:
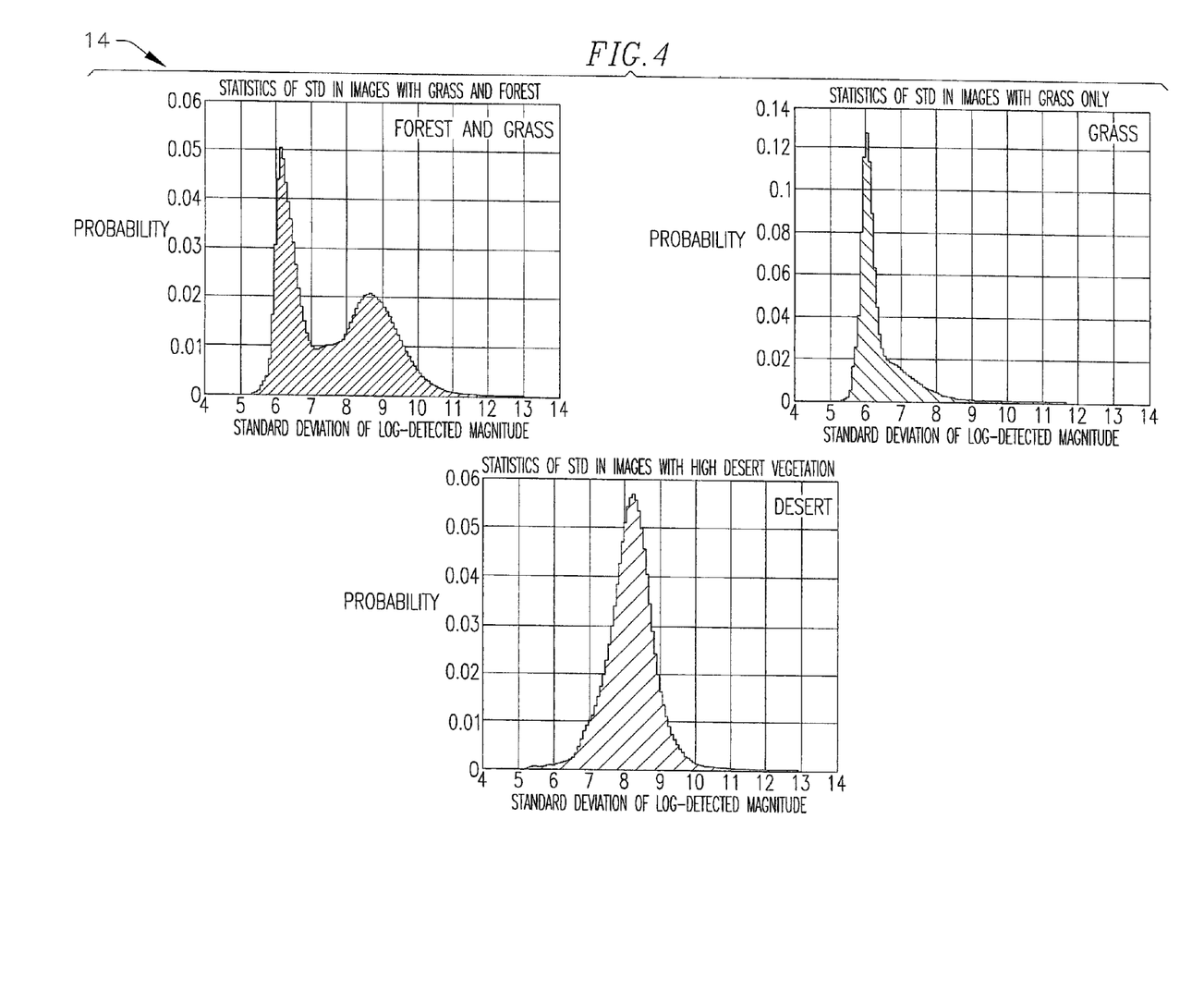
FIG. 4 shows histograms of the statistics of the standard deviation metric for three different terrains according to an embodiment of the invention.

The advantages of using the statistics of the standard deviation metric to differentiate between the different types of vegetation in a SAR image 12 can be seen in the embodiment depicted in FIG. 4. In FIG. 4, the statistics of the standard deviation metric for three different terrains: a mixed terrain of interspersed forest and grass, grass only, and desert are shown. One hundred SAR images from each terrain type were used to compile the statistics. The standard deviation metric statistics for mixed forest and grass terrain is clearly bi-modal, while the metric statistics for grass is biased toward low standard deviation values. The distribution for desert lies between the high point of the mixed grass and forest distribution and the low point of the grass distribution, exhibiting Gaussian-like behavior.

Figure 5:
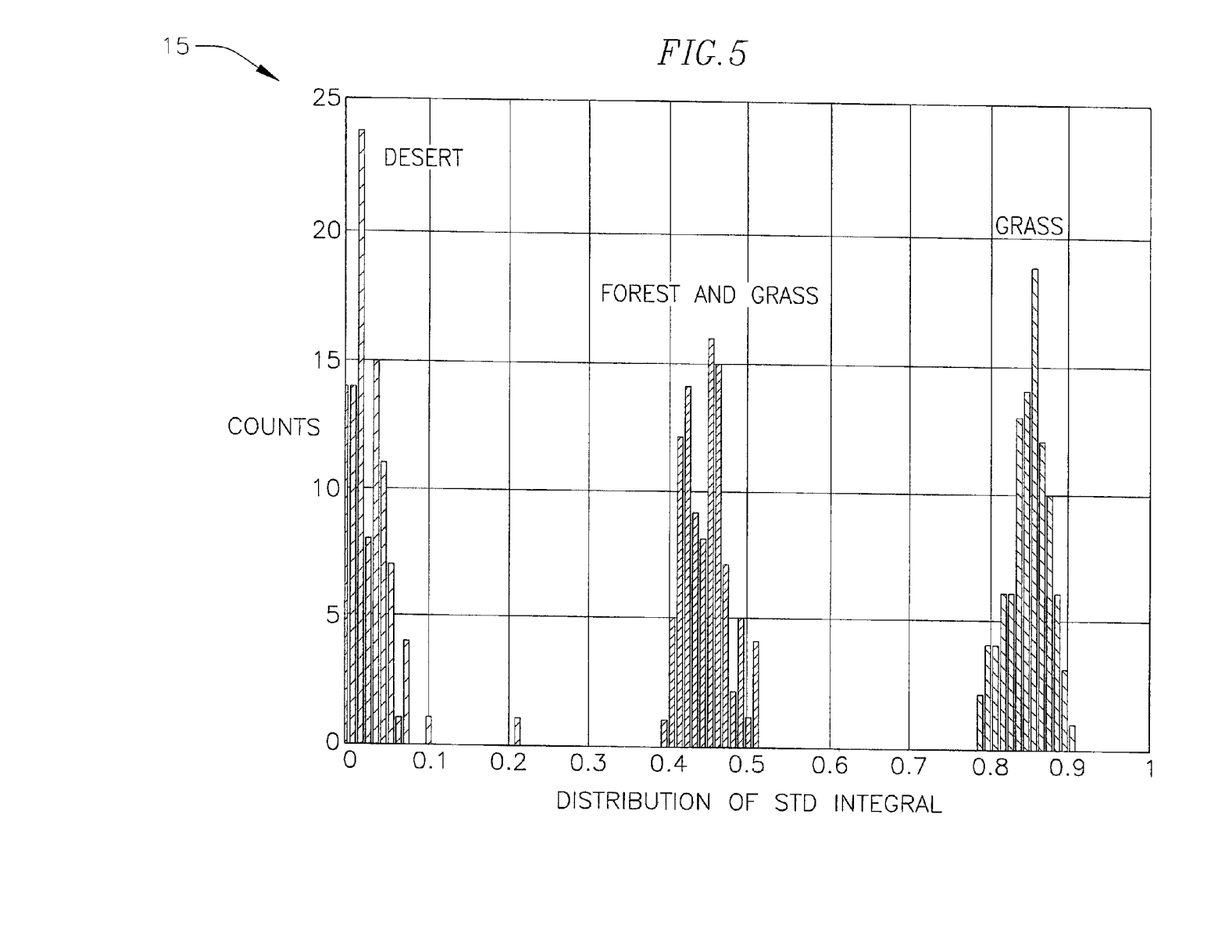
FIG. 5 shows a histogram for the integrals of the three vegetation types of FIG. 4.

One way to exploit the statistics of the standard deviation metric to execute automatic vegetation classification is to evaluate the integral of the normalized metric distribution from 0 to 7 (the units here are the standard deviation of the log-detected pixel magnitude), as shown in the histogram 15 of FIG. 5. The histogram integral limits can be selected to maximize the separation between the different terrain types. The integral limits used in this embodiment, between 0 and 7 (in units of standard deviation, a), have been shown to neatly separate terrains of interspersed forest and grass, grass only terrains, and desert terrains. FIG. 5 shows histograms for the integral for these three vegetation types. There is a clear separation between the three vegetation types, for example between grass and desert, so simple thresholding can be used to perform the classification of the different vegetation types. Given the specified histogram integral limits, the normalized integral values that separate the different terrain types can then be selected. One of the thresholds can be placed at 0.32 in order to differentiate between desert and terrains with an interspersed mixture of grass and forest. Some additional examples of integral values (in units of unity) are shown in the table below:

| Parameter Name | Example Parameter Value |
| --- | --- |
| Histogram Integral Limits | 0 to 7 σ |
| Grass Terrain | Integral > 0.7 (normalized counts) |
| Forest and Grass Terrain | 0.6 > Integral > 0.32 (normalized counts) |
| Desert Terrain | Integral < 0.25 (normalized counts) |
| STD Threshold | 8 σ |

The STD threshold for generating the threshold image 18 is selected to ensure that the unwanted clutter type (e.g. forest) is found. With such a threshold, there is only a small chance that mixed forest terrains may be misclassified as desert, and the chance of misclassifying desert as grass is vanishingly small. The thresholds and parameters in the table above, in addition to the window size mentioned above and the number of growth pixels discussed below, must be calibrated to the specific radar system that is employed and each may depend on the number of clutter types of interest. It is suggested that around 100 SAR images for each type of clutter (e.g. mixed forest and grass, grass only, and desert) be analyzed in order to select the right thresholds and parameters that yield optimal clutter classification and segmentation performance.

While the formation and display of a STD image 13 and STD histograms 14 are helpful in classifying the types of vegetation in the SAR image 12 into different groups, these objects need not actually be visualized, as long as the integral is calculated and the different types, such as vegetation types, are thresholded into different groups.

Image Segmentation

The second stage of the system consists of SAR image 12 segmentation. In segmentation, areas of interest are identified by applying a standard deviation value threshold to create a threshold image 18. For example, the STD image 13 formed in the classification stage 10 can be thresholded using the classifications thresholds determined during the classification stage 10. A threshold image 18 can also be formed using the previously determined threshold values and the standard deviation values for each pixel 25 without having to first form the STD image 13.

Figure 6:
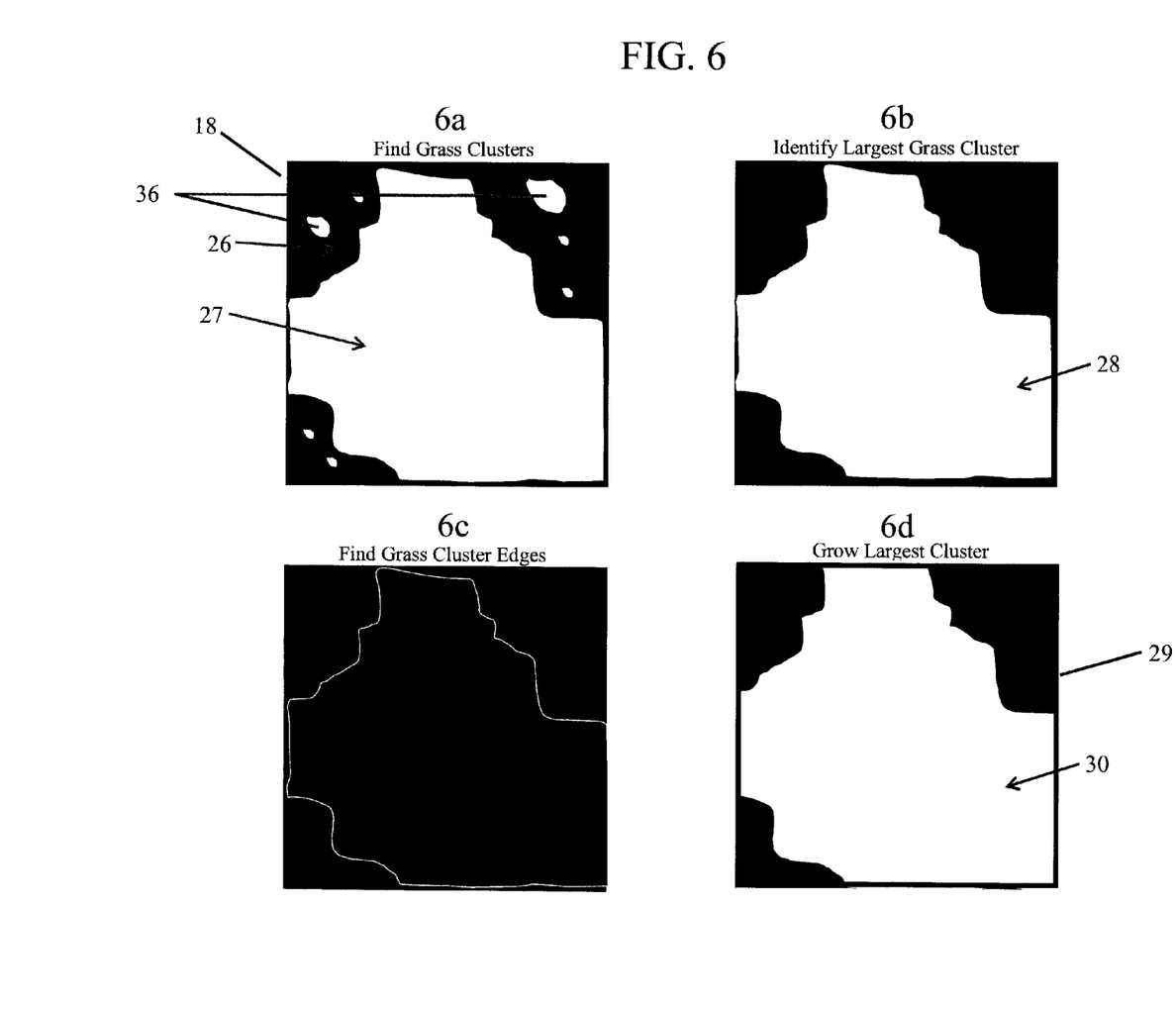

In the embodiment illustrated in FIG. 6a, clusters 36 of forest 26 and grass 27 can be formed by applying a standard deviation threshold, which yields a binary image of forest 26 and grass 27. The result is a threshold image 18 in which the white pixels represent grass 27 and black pixels represent forest 26. FIG. 6a shows the binary threshold image 18. RBG threshold images may also be used, for example, where one color represents the threshold for grass, another represents the threshold for forest, and another color represents the threshold for desert.

In a further embodiment, the grass supercluster 28, i.e. the largest contiguous region of grass as shown in FIG. 6b, is accepted as the only region of grass 27, all other smaller clusters 36 are deemed as forest 26. It is also possible to instead accept the top N largest grass clusters 36.

At this point in the segmentation algorithm, it is important to note that the pixel classification is biased toward forest 26 at the vegetation boundaries (i.e. the tree line). That is, grass pixels 27 are classified as forest pixels 26 because of biases in the standard deviation metric. Biases of this sort are common to SAR image segmentation systems. It is important to rectify this bias because vehicles that are close to the tree line would be missed due to the fact that the pixels 25 that they occupy are deemed as forest 26. In one embodiment, this bias can be counter-balanced by "growing" 20 the size of the grass supercluster 28. This is achieved by first identifying the boundary of the grass supercluster 28 using a boundary finding routine as shown in FIG. 6c. The boundary finding routine consists of an iterative procedure that starts with a pixel within the supercluster and then simply checks for neighboring pixels that have a different value until no new pixels with differing neighbor values are found. The supercluster 28 is then grown by a specified number of pixels (e.g. 25) at the boundary. The number of pixels by which the supercluster 28 is grown is determined during the calibration of the algorithm for a specific radar system. The preferred range to grow the supercluster 28 by is 25 pixels. FIG. 6d shows the final binary image 29 of this embodiment with a grown supercluster 30. The final binary image 29 can be used to mask forest pixels 26 and increase the effectiveness of conventional CFAR algorithms.

For example, in one embodiment, a mask can be constructed consisting of grass pixels 27 only; i.e., forest pixels 26 are masked. The CFAR algorithm 23 then operates exclusively on the now-defined grass pixels 27. Similarly, in one embodiment, for pixels deemed to be not forest, e.g. grass 27 or desert, every pixel may be accepted as shown in step 22 and CFAR 23 will run on each of these pixels, as shown in FIG. 2. For pixels designated as forest 26, a threshold image can be formed 18, clusters 36 can be determined 19, the supercluster can be grown 20 and only grass pixels may be accepted 21 to run CFAR and downstream processing 23. Although this configuration is preferred, many other configurations are possible. For example, CFAR 23 may be run on every pixel in the SAR image 12 that is grass or desert, and only not on pixels 25 classified as forest 26. Also, only a subset or subsets of the SAR image 13 may be used for image segmentation. This invention includes any possible configurations known or obvious to one of ordinary skill in the art.

Figure 7:
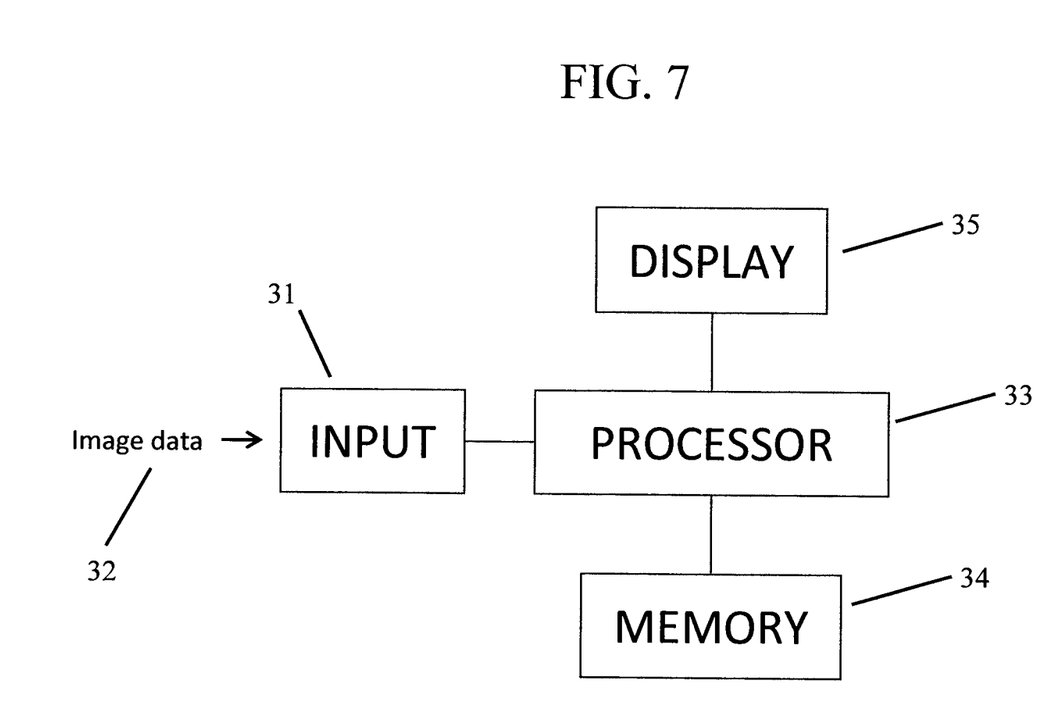
FIG. 7 shows a block diagram of the computer components for running the classification and segmentation system according to an embodiment of the invention.

FIG. 7 is a block diagram illustrating components capable of running the classification and segmentation system according to an embodiment of the invention. An input 31 receives the image data 32, which includes the magnitudes of the pixels 25 described in FIG. 1. The input 31 is connected to processor 33. The processor 33 contains stored memory 34 that runs the analytics and calculations for classifying the different groups, e.g. vegetation types, as described in the classification stage 10. A display 35 is attached to the processor 33 to display the STD image 13, histograms 14 and/or threshold image 18.

Figure 8:
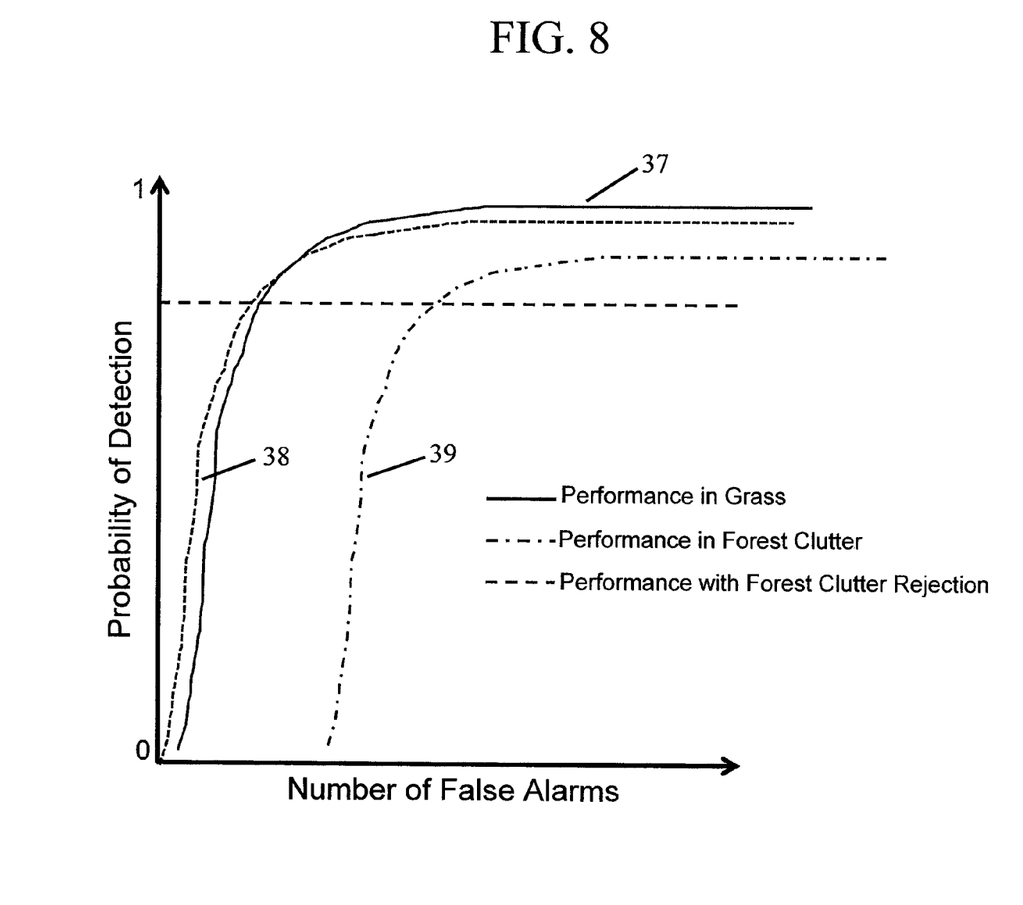
FIG. 8 shows an illustration of the measured Receiver Operational Characteristic (ROC) curves obtained from a set of data.

The homogeneity and stability of the standard deviation method is more conducive to classification and follow-on segmentation of the image 12 and helps downstream target detection algorithms yield better performance. For example, FIG. 8 shows a notional illustration of the measured Receiver Operational Characteristic (ROC) curves obtained from a set of data. The probability of target detection is plotted against the number of reported false alarms. The black curve 37 represents the performance of the CFAR algorithm when the terrain is uniformly grass. The curve 39 represents the performance of the CFAR algorithm in forest clutter. The curve 38 represents the performance of the CFAR algorithm in forest clutter after the application of our clutter classification and segmentation algorithm. There are regions where the performance shown by the curve 38 exceeds that of the curve 37. For a higher number of false alarms, the performance shown by the curve 38 is not quite as high as that of the curve 37 because there are cases when the targets are shadowed by trees. When the performance is evaluated for a probability of detection indicated by the horizontal dashed line, the application of our system reduced the number of false alarms by a factor of 3.

In addition to providing stable and accurate boundaries between grass and forested areas, there are other advantages to the classification and segmentation system. Unlike some previously used systems, the current system operates only on the log-magnitude image, so there is no need to parse phase information and it is therefore easily implemented on a tactical radar processor. The system has a low memory and processor usage footprint. The computational load of the current classification and segmentation system is several orders of magnitude less than the CMS algorithm of Fosgate et al. (in terms of memory and floating point operations), which makes it viable for real time system implementation. Also, since the algorithm masks unwanted vegetation clutter, it can reduce the computational load of downstream target detection and classification algorithms. The system has been observed to reduce the number of CFAR false alarms by up to a factor for 3.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A system for processing an image having an image sensor configured to collect image data representing different terrain types comprising:
    an input configured to receive the image data comprising pixels wherein each pixel has a magnitude;
    a processor;
    a memory, wherein the memory has stored therein instructions that, when executed by the processor, causes the processor to:
        calculate log-magnitudes from the magnitudes of at least a plurality of the pixels;
        calculate standard deviations of the log-magnitudes for subsets of the plurality of pixels;
        compute an integral of the standard deviations over a desired range; and
    an output configured to send threshold data, wherein the threshold data comprises information representing different groups of pixels classified based on a value of the integral relative to one or more integral values.

2. The system of claim 1, wherein the output is configured to be displayed as a threshold image comprising the pixels of at least two of the different groups.

3. The system of claim 1, wherein one of the different groups represents grass pixels.

4. The system of claim 1, wherein the subsets are between 250 pixels and 3,246,900 pixels.

5. The system of claim 1, wherein the memory has stored therein instructions that, when executed by the processor, causes the processor to run a constant false alarm rate algorithm on at least a portion of one of the different groups.

6. The system of claim 1, wherein at least one of the different groups consists of a cluster and the memory has stored therein instructions that, when executed by the processor, causes the processor to increase the cluster by growing at least one boundary of the cluster.

7. The system of claim 6, wherein the memory has stored therein instructions that, when executed by the processor, causes the processor to grow at least one boundary by 10 to 50 pixels.

8. The system of claim 6, wherein the memory has stored therein instructions that, when executed by the processor, causes the processor to run a constant false alarm rate algorithm on at least one cluster.

9. Method of processing an image, representing different terrain types, having pixels wherein each pixel has a magnitude comprising:
    calculating log-magnitudes from the magnitudes of a plurality of the pixels;
    calculating standard deviations of the log-magnitudes for subsets of the plurality of pixels;
    computing an integral of the standard deviations over a desired range;
    classifying the pixels into different groups based on a value of the integral relative to one or more integral values.

10. The method of claim 9, further comprising the step of displaying a threshold image from the pixels of at least two of the different groups.

11. The method of claim 9, wherein one of the different groups represents grass pixels.

12. The method of claim 9 above, wherein the subsets are between 250 pixels and 4000 pixels.

13. The method of claim 9, further comprising the step of running a constant false alarm rate algorithm on at least a portion of one of the different groups.

14. The method of claim 9, wherein at least one of the different groups consists of a cluster and wherein the method further comprises the step of increasing the cluster by growing at least one boundary of the cluster.

15. The method of claim 14, further comprising the step of growing at least one boundary by 10 to 50 pixels.

16. The method of claim 14, further comprising the step of running a constant false alarm rate algorithm on at least one cluster.

* * * * *